(12) United States Patent
Lin et al.

(10) Patent No.: US 8,644,015 B2
(45) Date of Patent: Feb. 4, 2014

(54) MOUNTING APPARATUS FOR DATA STORAGE DEVICE

(75) Inventors: Chieh-Hsiang Lin, New Taipei (TW); Chih-Min Lin, New Taipei (TW); Wen-Chen Wang, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 260 days.

(21) Appl. No.: 13/191,472

(22) Filed: Jul. 27, 2011

(65) Prior Publication Data
US 2012/0147548 A1 Jun. 14, 2012

(30) Foreign Application Priority Data
Dec. 9, 2010 (TW) .............................. 99142924 A

(51) Int. Cl.
*G06F 1/16* (2006.01)
*E04G 3/00* (2006.01)
*F16M 13/00* (2006.01)
*H05K 5/00* (2006.01)

(52) U.S. Cl.
USPC .............. 361/679.31; 361/679.33; 248/274.1; 248/636

(58) Field of Classification Search
USPC ............ 361/679.31, 679.33, 679.37, 679.39, 361/679.41, 679.43; 248/224.8, 274.1, 636
See application file for complete search history.

(56) References Cited

U.S. PATENT DOCUMENTS

| 2008/0259554 A1* | 10/2008 | Qin et al. ...................... 361/685 |
| 2009/0129009 A1* | 5/2009 | Zhang et al. ............. 361/679.34 |
| 2009/0230276 A1* | 9/2009 | Peng et al. .................... 248/544 |
| 2009/0279244 A1* | 11/2009 | Crippen et al. .......... 361/679.33 |
| 2011/0075347 A1* | 3/2011 | Liu ........................... 361/679.33 |

* cited by examiner

*Primary Examiner* — Jenny L Wagner
*Assistant Examiner* — Ahmad D Barnes
(74) *Attorney, Agent, or Firm* — Altis Law Group, Inc.

(57) ABSTRACT

A mounting apparatus includes a bracket for fixing a data storage device, a handle pivotably mounted to the bracket, and a resisting member movably attached to an outer surface of the bracket. The handle includes a pressing portion. The resisting member includes a resisting portion and a connecting portion formed from one end of the resisting portion. When the handle is operated to pivot toward the bracket, the pressing portion resists against the connecting portion to bias the resisting portion to be deformed away from the outer surface of the bracket.

17 Claims, 5 Drawing Sheets

MOUNTING APPARATUS FOR DATA STORAGE DEVICE

CROSS-REFERENCE TO RELATED APPLICATION

Relevant subject matter is disclosed in a pending U.S. patent application Ser. No. 13/189,575 filed on Jul. 25, 2011 and entitled "MOUNTING APPARATUS FOR DATA STORAGE DEVICE", which is assigned to the same assignee with this patent application.

BACKGROUND

1. Technical Field

The present disclosure relates to mounting apparatuses and, more particularly, to an apparatus for mounting a data storage device.

2. Description of Related Art

Many electronic apparatus, such as computers and servers, include data storage devices, such as hard disk drives, compact disk read-only memory drives, digital video disk drives, and floppy disk drives. These devices are added to increase functionality of the apparatus as desired by a user. The installation of a hard disk drive in a computer often involves using screws to attach the hard disk drive to a bracket, and then the bracket is fixed to a chassis of the computer. Usually, there is space between the bracket and the chassis, which is a weakness that can allow the data storage device to more easily vibrate or move about.

BRIEF DESCRIPTION OF THE DRAWINGS

Many aspects of the present embodiments can be better understood with reference to the following drawing. The components in the drawing are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
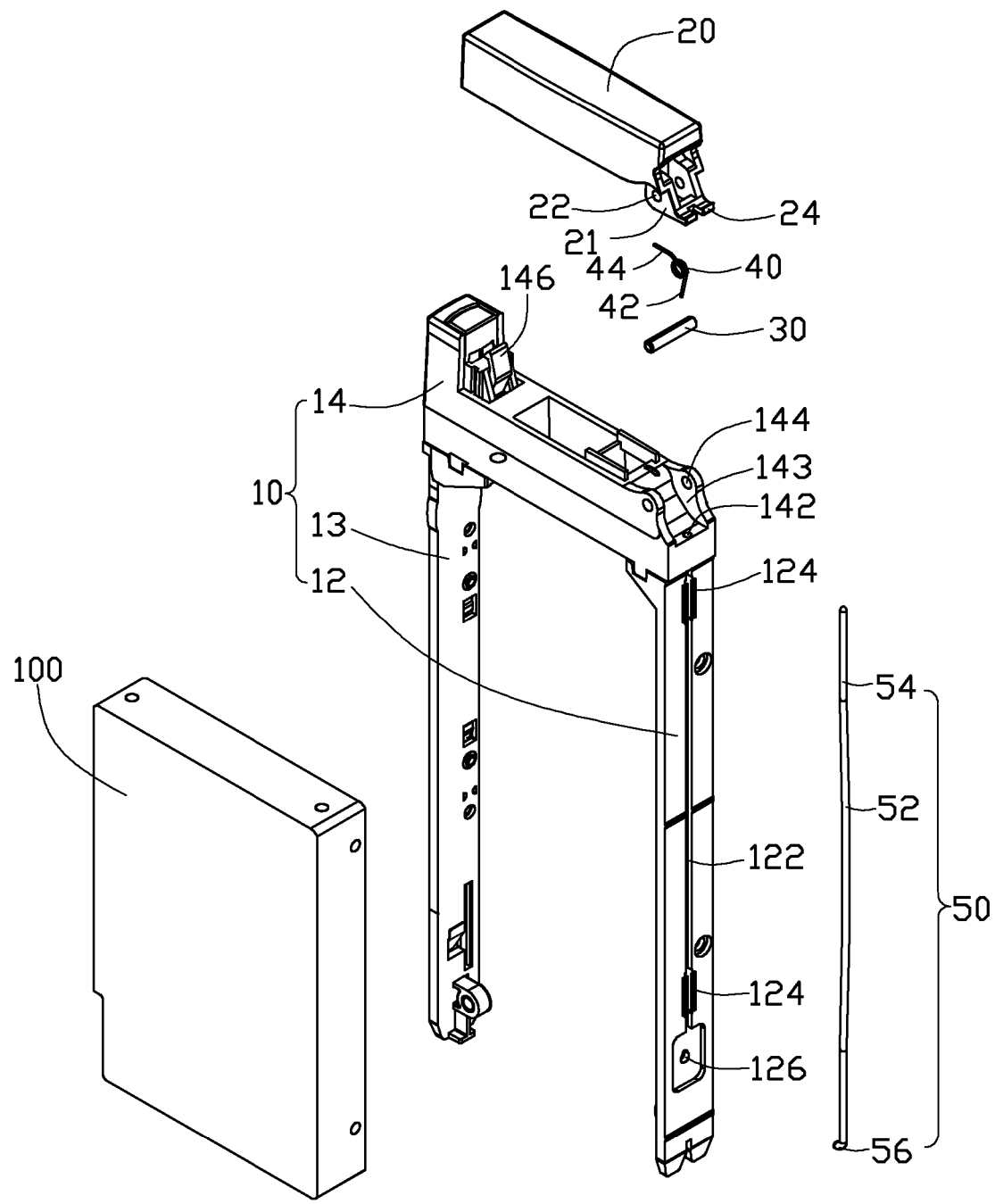
FIG. 1 is an exploded, isometric view of an embodiment of a mounting apparatus and a data storage device.
Figure 4:
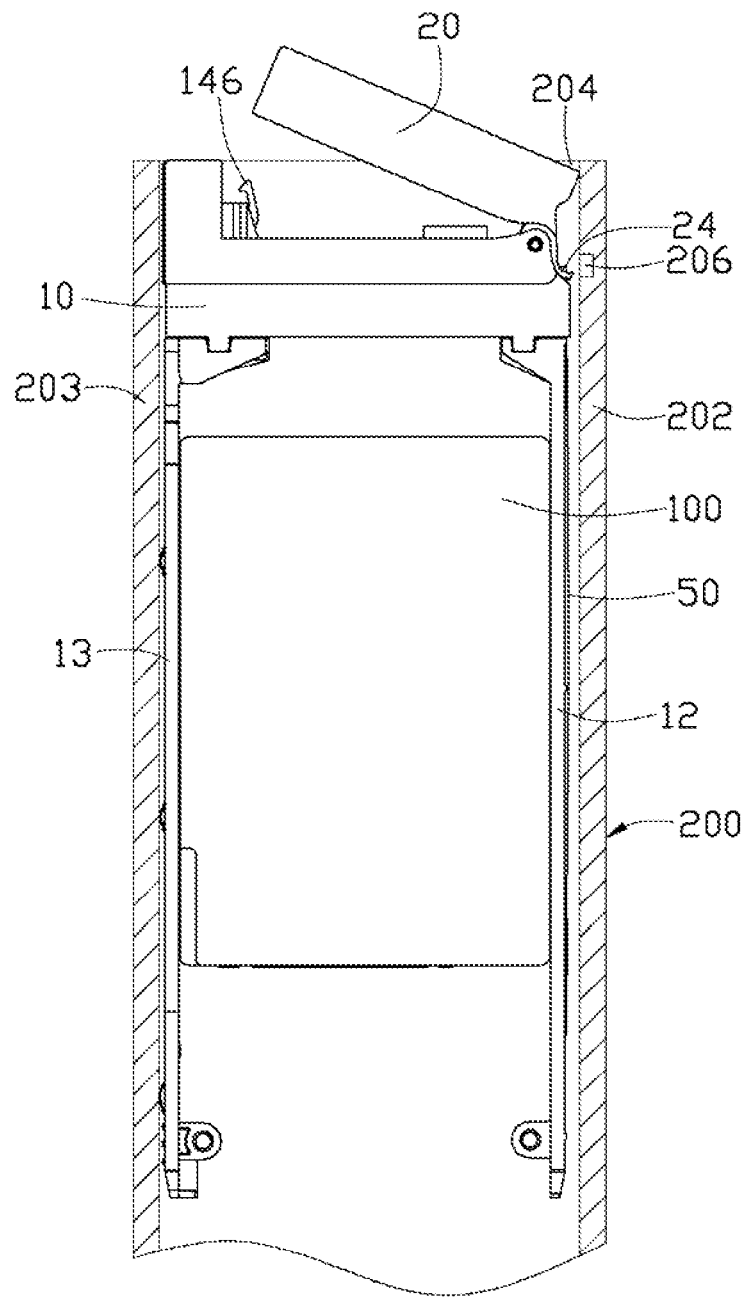
FIG. 4 is a sectional view of FIG. 3.

Referring to FIG. 1 and FIG. 4, an embodiment of a mounting apparatus is provided to mount a data storage device 100, such as a hard disk drive, in an enclosure 200. The mounting apparatus includes a bracket 10 receiving the data storage device 100, a handle 20, a shaft 30, a resilient member 40, and a resisting member 50.

The enclosure 200 includes a first sidewall 202 and a second sidewall 203 parallel to the first sidewall 202. An opening 204 is bound by the first ends of the first sidewall 202 and the second sidewall 203. A fixing hole 206 is defined in the first sidewall 202, adjacent to the opening 204.

Figure 2:
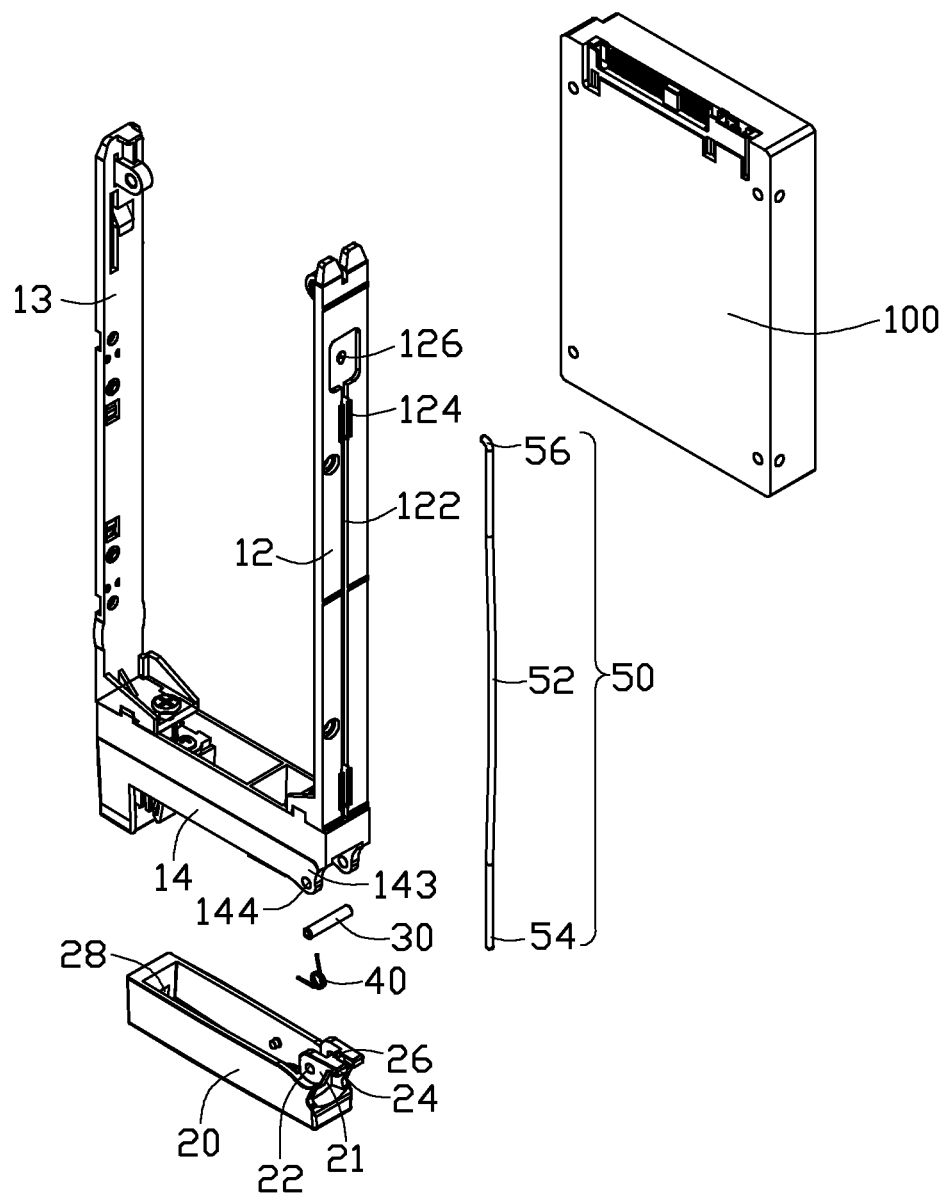
FIG. 2 is an inverted view of FIG. 1.

Referring to FIGS. 1 and 2, the bracket 10 includes a first mounting plate 12, a second mounting plate 13 parallel to the first mounting plate 12, and a base 14 connected between the first ends of the first mounting plate 12 and the second mounting plate 13. An elongated slot 122 is defined in an outer surface of the first mounting plate 12 opposite to the second mounting plate 13. Two pairs of limiting blocks 124 are formed extending from the outer surface of the first mounting plate 12. Each pair of limiting blocks 124 are positioned at opposite sides of the slot 122. A locking hole 126 is defined in a second end of the first mounting plate 12. The base 14 defines a through hole 142 in a first end of the base 14 adjacent to the first mounting plate 12. Two parallel pieces 143 extend from the first end of the base 14, at opposite sides of the through hole 142. A hook 146 is formed in a second end of the base 14 adjacent to the second mounting plate 13. A mounting hole 144 is defined in each piece 143.

The handle 20 includes two opposite pivot pieces 21 at a first end of the handle, each pivot piece 21 defining a pivot hole 22. The handle 20 further includes a fixing portion 24 and a pressing portion 26 formed at the first end of the handle 20. A hooking slot 28 is defined in a second end of the handle 20.

In this embodiment, the resilient member 40 is a torsion spring, and includes two opposite ends 42 and 44.

The resisting member 50 is substantially pole shaped and made from a long resilient metal wire. The resisting member 50 includes an elongated resilient resisting portion 52, and a connecting portion 54 and a fixing portion 56 formed at opposite ends of the resisting portion 52.

Figure 3:
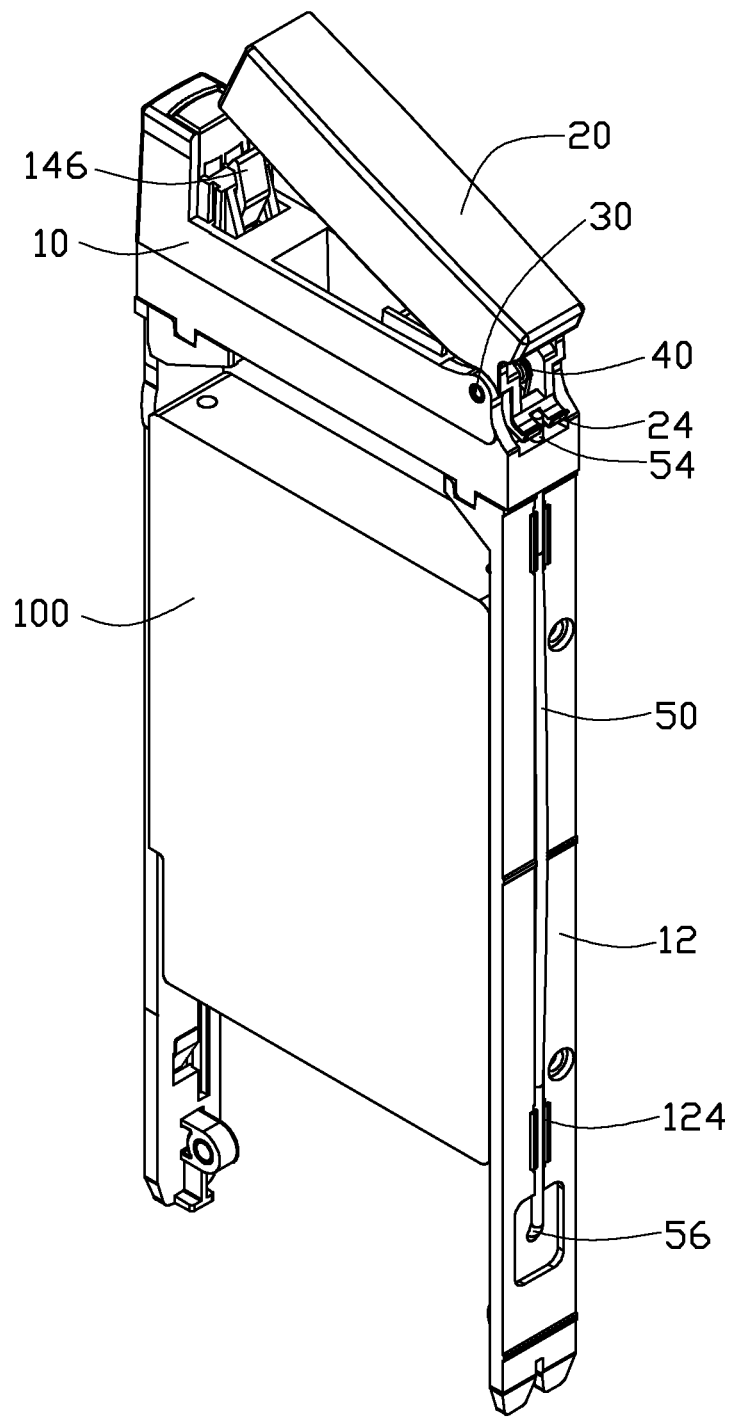
FIG. 3 is an assembled view of FIG. 1.

Referring to FIG. 3, in assembly, the first end of the handle 20 is pivotably mounted to the base 14 through the shaft 30 extending through the mounting holes 144 of the pieces 143 and the pivot holes 22 of the pivot pieces 21. The resilient member 40 is set around the shaft 30, with the opposite ends 42 and 44 resisting against the base 14 and the handle 20, respectively, thereby biasing the handle 20 to pivot away from the base 14. The connecting portion 54 extends through the through hole 142 from the slot 122, and aligns with the pressing portion 26. The resisting portion 52 is received in the slot 122 and is fixed in position by the limiting blocks 124. The fixing portion 56 is engaged in the locking hole 126 to prevent the resisting member 50 from moving along the elongated direction of the first mounting plate 12.

Figure 5:
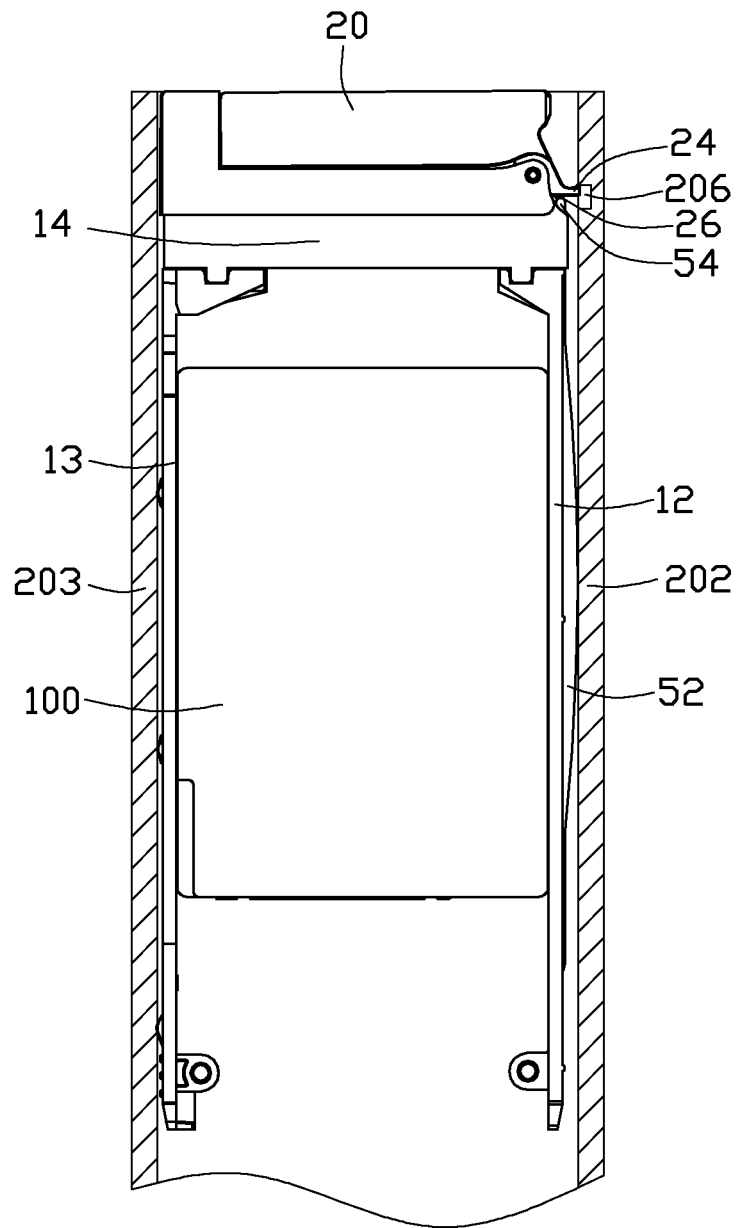
FIG. 5 is similar to FIG. 4, but showing a different state of use.

Referring to FIG. 4 and FIG. 5, in use, the data storage device 100 is placed among the first mounting plate 12, the second mounting plate 13, and the base 14. The bracket 10 enters the enclosure 200 between the first and second sidewalls 202 and 203 through the opening 204. When the fixing, portion 24 aligns with the fixing hole 206, the handle 20 is rotated about the shaft 30 toward the base 14 against the resilient member 40, until the hook 146 is locked in the hooking slot 28. The fixing portion 24 is engaged in the fixing hole 206. The pressing portion 26 presses the connecting portion 54 to bias the resisting portion 52 to be deformed to bend toward the first sidewall 202. The resisting portion 52 then resists against the first sidewall 202, for firmly mounting the bracket 10 in the enclosure 200.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A mounting apparatus for a data storage device, comprising:
   a bracket comprising a first mounting plate, a second mounting plate substantially parallel to the first mounting plate, and a base connected between the first mounting plate and the second mounting plate;
   a handle pivotably connected to a first end of the base adjacent to the first mourning, plate with a first end, wherein the handle comprises a pressing portion formed from the first end; and
   a resisting member movably mounted to an outer surface of the first mounting plate of the bracket opposite to the second mounting plate, wherein the resisting member comprises a resilient resisting portion, and a connecting portion formed from a first end of the resisting portion and extending through the base of the bracket;
   wherein when the handle is rotated toward the base, the pressing portion of the handle resists against the connecting portion of the resisting member to bias the resisting portion to be deformed away from the first mounting plate.

2. The mounting apparatus of claim 1, wherein the first mounting plate of the bracket defines a slot in the outer surface for receiving the resisting portion of the resisting member.

3. The mounting apparatus of claim 2, wherein two pairs of limiting blocks are formed from the outer surface of the first mounting plate, each pair of limiting blocks are located at opposite sides of the slot, to limit the resisting portion of the resisting member.

4. The mounting apparatus of claim 2, wherein the first mounting plate of the bracket defines a locking hole in an end of the first mounting plate opposite to the base, the resisting member further comprises a fixing portion formed from a second end of the resisting portion, the fixing portion is fixed in the locking hole.

5. The mounting apparatus of claim 4, wherein the base defines a through hole in the first end, the connecting portion of the resisting member extends through the through hole to extend out of the base.

6. The mounting apparatus of claim 1, wherein the resisting member is made from an elongated resilient metal wire.

7. The mounting apparatus of claim 1, wherein a hooking slot is defined in a second end of the handle adjacent to the second mounting plate of the bracket, a hook extends from a second end of the base to be locked in the second locking slot to latch the handle to the base.

8. The mounting apparatus of claim wherein the handle is pivotably mounted to the base through a shaft extending through the handle and the base, a resilient member is set around the shaft, to bias the handle to pivot away from the base.

9. A data storage assembly comprising:
   an enclosure comprising a first sidewall, and a second sidewall substantially parallel to the first sidewall, the enclosure defining an opening between the first sidewall and the second sidewall, the first sidewall defining a fixing hole adjacent to the opening;
   a bracket comprising a first mounting plate, a second mounting plate substantially parallel to the first mounting plate, a base connected between the first mounting plate and the second mounting plate, and a handle pivotably connected to a first end of the base adjacent to the first mounting plate with a first end, wherein the handle comprises a pressing portion and a fixing portion both formed from the first end of the handle;
   a data storage device fixed in the bracket between the first mounting plate and the second mounting plate of the bracket; and
   a resisting member movably mounted to an outer surface of the first mounting plate of the bracket opposite to the second mounting plate, wherein the resisting member comprises a resilient resisting portion and a connecting portion formed from a first end of the resisting portion and extending through the base of the bracket;
   wherein when the bracket is mounted in the enclosure, the handle is rotated toward the base, the pressing portion of the handle resists against the connecting portion of the resisting member to bias the resisting portion to be deformed toward the first sidewall of the enclosure, until the resisting portion resists against the first sidewall of the enclosure.

10. The assembly of claim 9, wherein the first mounting plate of the bracket defines a slot in the outer surface for receiving the resisting portion of the resisting member.

11. The assembly of claim 10, wherein two pairs of limiting blocks are formed from the outer surface of the first mounting plate, each pair of limiting blocks are located at opposite sides of the slot to limit the resisting portion of the resisting member.

12. The assembly of claim 10, wherein the first mounting plate of the bracket defines a locking hole in an end of the first mounting plate opposite to the base, the resisting member further comprises a fixing portion formed from a second end of the resisting portion, the fixing portion is fixed in the locking hole.

13. The assembly of claim 12, wherein the base defines a through hole in the first end, the connecting portion of the resisting member extends through the through hole to extend out of the base.

14. The assembly of claim 9, wherein the resisting member is made from an elongated resilient metal wire.

15. The assembly of claim 9, wherein a hooking slot is defined in a second end of the handle adjacent to the second mounting plate of the bracket, a hook extends from a second end of the base to be locked to the second locking slot to latch the handle to the base.

16. The assembly of claim 9, wherein the handle is pivotably mounted to the base through a shaft extending through the handle and the base, a resilient member is set around the shaft and arranged between the handle and the base, to bias the handle to pivot away from the base.

17. A device assembly comprising:
   an enclosure comprising a first sidewall, and a second sidewall substantially parallel to the first sidewall, the enclosure defining an opening between the first sidewall and the second sidewall, the first sidewall defining a fixing hole adjacent to the opening;
   a bracket comprising a first mounting plate, a second mounting plate substantially parallel to the first mounting plate, a base connected between the first mounting plate and the second mounting plate, and a handle pivotably connected to a first end of the base adjacent to the first mounting plate with a first end, wherein the handle comprises a pressing portion and a fixing portion both formed from the first end of the handle;
   a device fixed in the bracket between the first mounting plate and the second mounting plate of the bracket; and
   a resisting member movably mounted to an outer surface of the first mounting plate of the bracket opposite to the second mounting plate, wherein the resisting member comprises a resilient resisting portion and a connecting portion formed from a first end of the resisting portion and extending through the base of the bracket;

wherein when the bracket is mounted in the enclosure, the handle is rotated toward the base, the pressing portion of the handle resists against the connecting portion of the resisting member to bias the resisting portion to be deformed toward the first sidewall of the enclosure; until the resisting portion resists against the first sidewall of the enclosure.

* * * * *